(12) United States Patent
Kishima (10) Patent No.: US 7,166,417 B2
(45) Date of Patent: *Jan. 23, 2007

(54) METHOD FOR MANUFACTURING RECORDING MEDIA, METHOD FOR MANUFACTURING PRODUCTION PLATE USED WHEN MANUFACTURING RECORDING MEDIA, APPARATUS FOR MANUFACTURING RECORDING MEDIA, AND APPARATUS FOR MANUFACTURING PRODUCTION PLATE USED WHEN MANUFACTURING RECORDING MEDIA

(75) Inventor: Koichiro Kishima, Kanagawa (JP)

(73) Assignee: Sony Corporation (JP)

( * ) Notice: Subject to any disclaimer, the term of this patent is extended or adjusted under 35 U.S.C. 154(b) by 41 days.

This patent is subject to a terminal disclaimer.

(21) Appl. No.: 09/959,480

(22) PCT Filed: Feb. 28, 2001

(86) PCT No.: PCT/JP01/01518

§ 371 (c)(1),
(2), (4) Date: May 28, 2003

(87) PCT Pub. No.: WO01/63607

PCT Pub. Date: Aug. 30, 2001

(65) Prior Publication Data
US 2004/0081919 A1    Apr. 29, 2004

(30) Foreign Application Priority Data
Feb. 28, 2000    (JP) ............................ 2000-051957

(51) Int. Cl.
*G11B 7/24*    (2006.01)
(52) U.S. Cl. ...................... 430/321; 430/320; 430/322; 430/945; 369/116; 369/284
(58) Field of Classification Search ................ 430/321, 430/8, 945, 320, 322; 359/10, 248; 369/44.38, 369/44.25, 284, 116; 360/100
See application file for complete search history.

(56) References Cited

U.S. PATENT DOCUMENTS 4,454,221 A * 6/1984 Chen et al. .................. 430/316

(Continued)

FOREIGN PATENT DOCUMENTS

JP    54-72009    6/1979

(Continued)

OTHER PUBLICATIONS

"A rewritable optical disk system with over 10GB of capacity" by K. Osata, et al, pp. 80-86 in "Proceedings of Optical Data Storage '98" Aspen, Colorado.

*Primary Examiner*—Thorl Chea
(74) *Attorney, Agent, or Firm*—Rader Fishman & Grauer PLLC; Ronald P. Kananen (57) ABSTRACT

When manufacturing a recording medium, a material layer 12 formed on a substrate 11 that composes the recording medium is exposed to a laser beam in accordance with a recording pattern. The material layer 12 has a predetermined reflectivity for the laser beam 13 so as to produce return light for the laser beam 13. By detecting this return light, the focusing of the laser beam on the material layer is adjusted. By doing so, a laser beam can be easily and accurately focused on a material layer during a process in which a laser beam is shone, in accordance with a recording pattern, onto a material layer formed on a recording medium or a production plate used when manufacturing a recording medium.

6 Claims, 8 Drawing Sheets

U.S. PATENT DOCUMENTS

| | | | |
|---|---|---|---|
| 4,729,940 A * | 3/1988 | Nee et al. | 205/655 |
| 4,797,316 A * | 1/1989 | Hecq et al. | 428/167 |
| 5,645,978 A * | 7/1997 | Inui et al. | 430/321 |
| 6,072,762 A * | 6/2000 | Kume et al. | 369/116 |
| 6,773,868 B1 * | 8/2004 | Kishima et al. | 430/320 |

FOREIGN PATENT DOCUMENTS

| | | |
|---|---|---|
| JP | 58-57644 | 4/1983 |
| JP | 5-151572 | 6/1993 |
| JP | 9-35269 | 2/1997 |
| JP | 9-161298 | 6/1997 |
| JP | 11-265509 | 9/1999 |
| WO | 01/65553 * | 3/2000 |

* cited by examiner

FIG. 3A (DATA PATTERN)

FIG. 3B (LASER BEAM EXPOSURE PATTERN)

FIG. 3C (LASER BEAM EXPOSURE PATTERN)

FIG. 3D (FINE INDENTATIONS AND/OR PROJECTIONS PATTERN)

PHOTOSENSITIVITY

γ (GAMMA) CURVE

PHOTOSENSITIVE
REACTION LEVEL

AMOUNT OF EXPOSURE

METHOD FOR MANUFACTURING RECORDING MEDIA, METHOD FOR MANUFACTURING PRODUCTION PLATE USED WHEN MANUFACTURING RECORDING MEDIA, APPARATUS FOR MANUFACTURING RECORDING MEDIA, AND APPARATUS FOR MANUFACTURING PRODUCTION PLATE USED WHEN MANUFACTURING RECORDING MEDIA

TECHNICAL FIELD

The present invention relates to a method for manufacturing a recording medium, a method for manufacturing a production plate used when manufacturing recording media, an apparatus for manufacturing a recording medium, and an apparatus for manufacturing a production plate used when manufacturing recording media.

The expression "production plate used when manufacturing recording media" refers to a stamper that is used for producing a recording medium with fine indentations and/or projections using injection molding, photo polymerization (the "2P method"), or other method, a plate used to form stampers through transfer copying, a plate used for producing a "mother-master" for making multiple copies of the stamper through transfer copying, or other such plates.

BACKGROUND ART

At present, there are demands for ever higher recording densities.

In recent years, optical pickups that optically reproduce information have been developed with a "near-field" construction where the distance from the recording medium to the optical lens is 200 nm or below.

Near-field constructions are used with the object of raising recording density. This is achieved by reducing the size of the beam spot by raising the numerical aperture (NA) of the optical lens system and using a short-wavelength laser (which is to say, a blue-violet laser). This enables the track pitch and the widths and lengths of recording marks to be reduced.

However, the spot diameter of a beam used during reproduction needs to be set at around double the width of the recording marks to ensure that the recording marks can be properly read. Putting this another way, it is desirable to form the recording marks on a recording medium with a size that is no greater than half the size of the minimum spot diameter of a beam used for reproduction.

Figure 9:
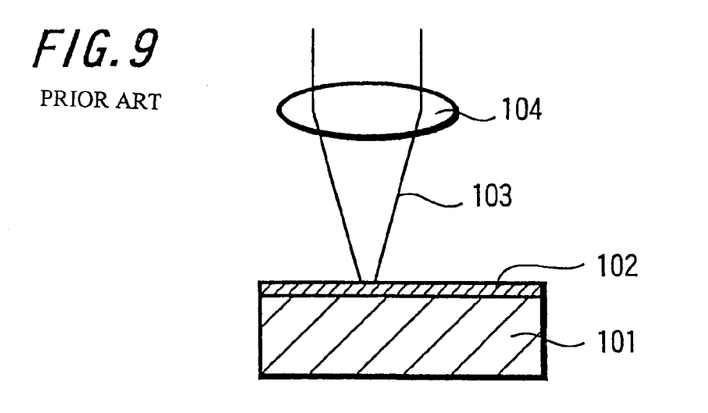
FIG. 9 is a simplified cross-sectional view for describing a method for manufacturing a production plate, for example, that uses a conventional photosensitive material.

The following processes are usually performed during the manufacturing process for recording media, such as during the manufacturing process for a production plate used when manufacturing recording media. These processes are illustrated in the simplified cross-section given in FIG. 9. A photosensitive material layer 102 is formed by performing spin coating on a substrate 101, such as a glass substrate, that composes the production plate. This photosensitive material layer 102 is then exposed, in accordance with data to be recorded for example, to a laser beam 103 that is focused by a condensing lens 104. After this, the photosensitive material layer 102 is developed, and, for example, the areas of the layer that underwent a photosensitive reaction with the incident laser beam are removed, to form a pattern in the photosensitive material layer 102. Etching is then performed on the substrate 101 with the photosensitive material layer 102 as a mask, so as to form fine indentations and/or projections corresponding to the recorded data.

Figure 10:
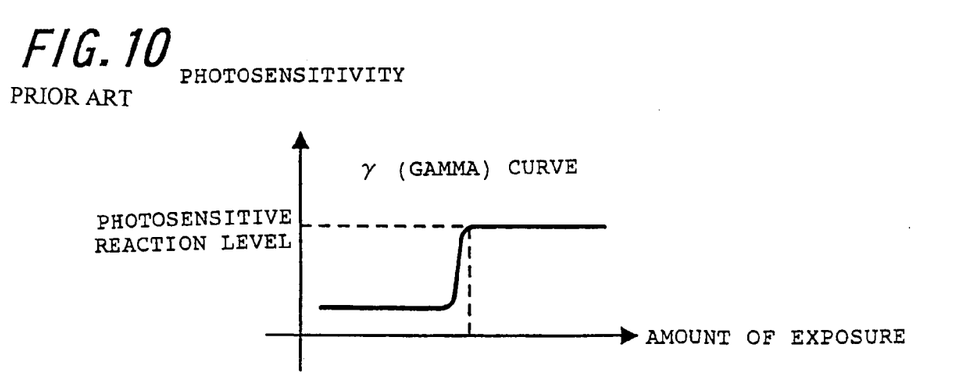
FIG. 10 is a graph showing a γ (gamma) curve for the photosensitive material.
Figure 11A:
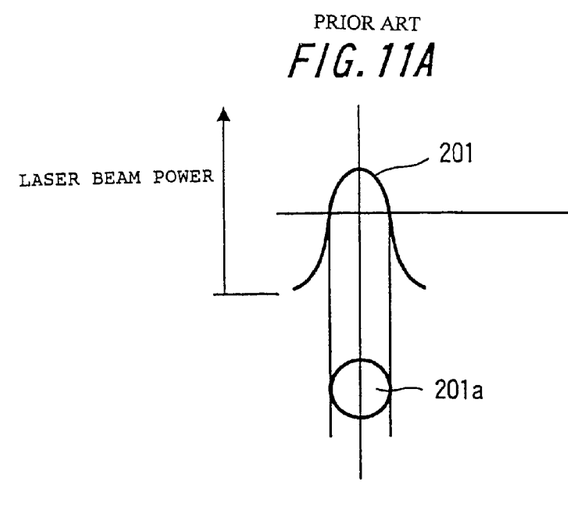
FIGS. 11A and 11B are used to describe a conventional method, and show the relationship between the power distribution of two laser beams and the photosensitive reacting regions.
Figure 11B:
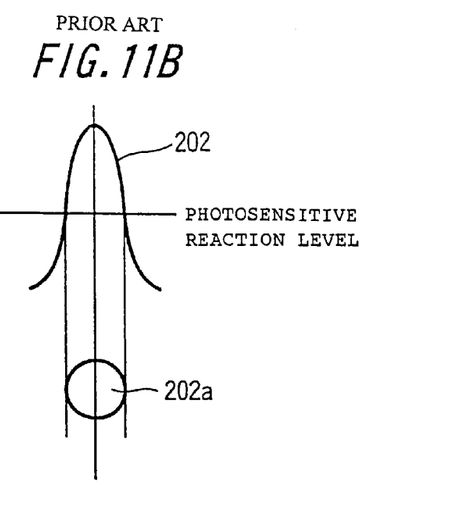

One characteristic of the photosensitive material is that the photosensitive reaction occurs rapidly when the material is exposed to a given amount of incident light or more, as shown by the step-like γ (gamma) curve in FIG. 10. Here, a case where the material is exposed to a laser beam for which the distribution of laser power is shown by the curve 201 in FIG. 11A is compared with a case where the material is exposed to a more powerful laser for which the distribution of laser power is shown by the curve 202 in FIG. 11B. While the effective photosensitive reacting region 202a of the photosensitive material layer 102 is slightly larger than the photosensitive reacting region 201a for the laser beam shown by the curve 201, this increase is not proportionate to the difference in laser power.

Figure 12A:
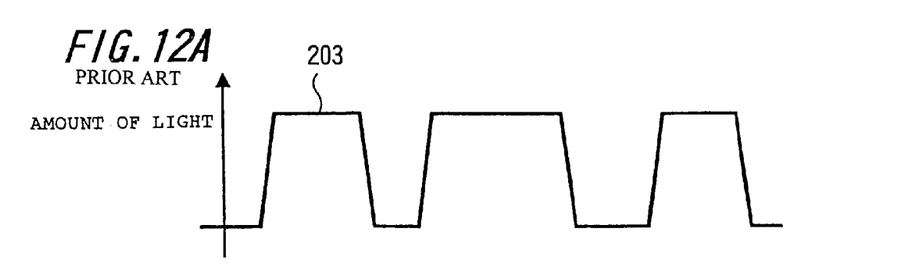
FIGS. 12A, 12B, and 12C are used to describe a conventional method, with FIG. 12A showing a laser beam pattern, FIG. 12B showing an exposure pattern, and FIG. 12C showing a pattern of indentations.
Figure 12B:
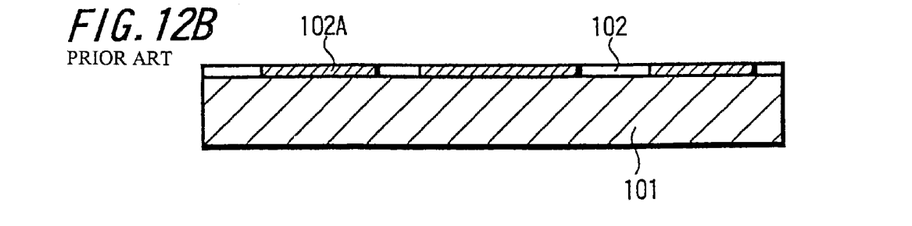
Figure 12C:
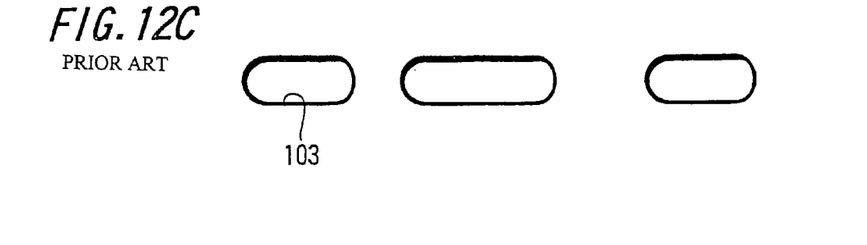

The above situation means that during the manufacturing process for a production plage used when manufacturing recording media, for example, if the substrate 101 is rotated so as to make the laser beam scan the photosensitive material layer 102 tracing a spiral route and the power of the laser is varied as shown by an illumination pattern shown by the curve 203 in FIG. 12A, exposed parts 102A are produced in the photosensitive material layer 102 on the substrate 101 in accordance with the illumination pattern, as shown in FIG. 12B. Developing results in the exposed parts being removed, for example. If etching is performed on the substrate 101 with the photosensitive material layer 102 as an etching mask, fine indentations and/or projections are formed in a stable pattern, as shown by the overhead view of an indentation 103 that can be used as a recording mark in FIG. 12C, for example.

However, when the above method is used, there is the following problem when performing focusing control of the exposing laser beam on the photosensitive material layer.

One method that can be potentially used to perform focusing control for the exposing laser beam is to detect return light that has been reflected back off the photosensitive material layer. However, since the photosensitive material layer is transparent for the laser beam used during this process, it is extremely difficult to perform focusing control by detecting the return light.

For this reason, when exposing the photosensitive material layer to laser light, a separate laser beam, such as a red HeNe laser, with a different wavelength to the exposing laser beam is usually used as a focus position adjusting laser beam.

However, since in this case a focus position adjusting laser beam is used along with the laser beam used for exposing the photosensitive material layer, the relative positioning of the two lasers must be set with high precision.

Also, while both laser beams are focused by the same condensing lens, if the two laser beams enter the condensing lens as collimated beams, the focal positions for the two lasers will be different due to the different wavelengths of the lasers.

As a result, it is necessary to adjust these focal positions in advance by providing a certain degree of bias. Since, as mentioned above, the red laser used as the focus position adjusting laser beam has a longer wavelength than the laser beam used for exposing the photosensitive material layer, its focal depth is wider. This means that it is difficult to adjust the focal position of the exposing laser beam, which is to say, the laser beam used to record data.

When two separate lasers are used as the focus position adjusting laser beam and the laser beam used to record data, there are additional problems for the recording equipment, such as increased complexity, increased size, and complicated handling.

The pattern of fine indentations and/or projections formed by exposing the photosensitive material layer in a given pattern is determined for the most part by the spot diameter of the laser beam to which the substrate is exposed. This means that it is not possible to form a pattern of fine indentations and/or projections in excess of the optical limits. As a result, even if the spot diameter of the reproduction laser beam is minimized as small as possible, the width of the recording marks cannot be reduced to half the spot diameter of the reproduction laser beam or less.

An electron beam lithography apparatus has been developed as a pattern exposing apparatus for exposing the photosensitive material layer. Such apparatus can form fine patterns, and thereby contributes to increases in the recording density. However, the lithographic operation has to be performed in a high vacuum, giving rise to the problem that an electron beam lithography apparatus is both large and expensive.

According to the present invention, when the process for manufacturing a recording medium or a production plate used when manufacturing recording media includes a process for exposing a material layer formed on a substrate, which composes the recording medium or the production plate used when manufacturing recording media, to a laser in accordance with a recording pattern, focusing control is performed without using a laser beam that is separate to the exposing laser beam as a focusing control laser beam. This solves the various problems that are listed above for the case where a focusing control laser beam is used.

Also, by making the width of recording marks equal to or smaller than the laser beam spot, an improvement is made in recording density.

Also, according to the present invention, an apparatus for manufacturing a recording medium or a production plate used when manufacturing recording media has a simplified construction, can be made small, is easy to handle, and is easy to maintain.

DISCLOSURE OF THE INVENTION

A method for manufacturing a recording medium according to the present invention includes a process for exposing a material layer formed on a substrate composing the recording medium to a laser beam in accordance with a recording pattern, wherein the material layer has a predetermined reflectivity for the laser beam so that return light is produced for the laser beam, and a focus of a spot produced by the laser beam on the material layer is adjusted by detecting the-return light.

A method for manufacturing a production plate used when-manufacturing recording media according to the present invention includes a process for exposing a material layer formed on a substrate composing the production plate to a laser beam in accordance with a recording pattern, wherein the material layer has a predetermined reflectivity for the laser beam so that return light is produced for the laser beam, and a focus of a spot produced by the laser beam on the material layer is adjusted by detecting the return light.

An apparatus for manufacturing a recording medium according to the present invention exposes a material layer formed on a substrate composing the recording medium to a laser beam in accordance with a recording pattern, and comprises holding means for holding a substrate composing the recording medium, wherein a heat-sensitive material layer, which has a predetermined reflectivity for a laser beam to which the substrate is exposed and forms altered parts when exposed to the laser beam, is formed on at least one principal surface of the recording medium; a laser source; modulating means for modulating a laser beam produced by the laser source in accordance with the recording pattern and also modulating the laser beam using a frequency that is higher than a cycle of the recording pattern; an optical system that includes a condensing lens system for focusing the laser beam on the material layer; moving means for moving an incident position of the laser beam on the material layer; and focus adjusting means for adjusting focus by detecting return light that is the laser beam reflected back off the material layer.

An apparatus for manufacturing a production plate used when manufacturing recording media according to the present invention exposes a material layer formed on a substrate composing the recording medium to a laser beam in accordance with a recording pattern, and comprises: holding means for holding a substrate composing the recording medium, wherein a heat-sensitive material layer, which has a predetermined reflectivity for a laser beam to which the substrate is exposed and forms altered parts when exposed to the laser beam, is formed on at least one principal surface of the recording medium; a laser source; modulating means for modulating a laser beam produced by the laser source in accordance with the recording pattern and also modulating the laser beam using a frequency that is higher than a cycle of the recording pattern; an optical system that includes a condensing lens system for focusing the laser beam on the material layer; moving means for moving an incident position of the laser beam on the material layer; and focus adjusting means for adjusting focus by detecting return light that is the laser beam reflected back off the material layer.

As described above, the method for manufacturing a recording medium and method for manufacturing a production plate used when manufacturing recording media according to the present invention include a process for exposing a material layer formed on a substrate to a laser beam in accordance with a recording pattern. The material layer has a predetermined reflectivity for the laser beam so that return light is produced for the laser beam. A focus is adjusted by detecting the return light. As a result, focus can be accurately adjusted without using a separate laser beam for focus adjustment.

Also, the apparatus for manufacturing a recording medium and a production plate used when manufacturing recording media according to the present invention do not need to operate in a high vacuum. This means that the apparatuses can be made small and compact.

BEST MODE FOR CARRYING OUT THE INVENTION

The present invention is applied to a method for manufacturing recording media where a near-field construction and a short-wavelength blue-violet laser are used.

Figure 1:
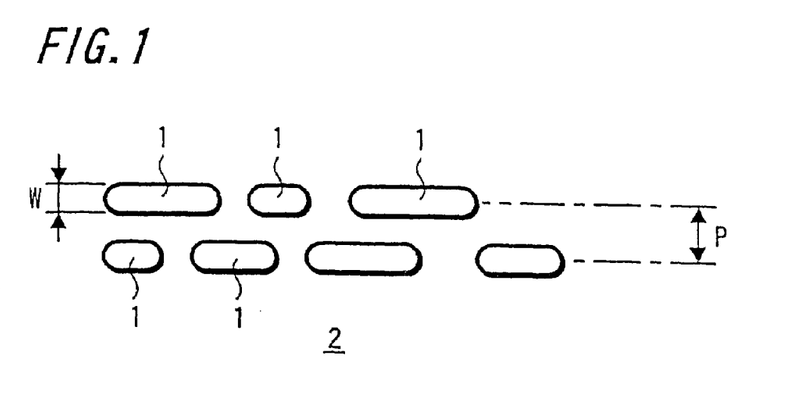
FIG. 1 shows an overhead view of one example of a desired pattern of fine indentations and/or projections that is produced by the method for manufacturing a recording medium and a production plate according to the present invention.

The method for manufacturing a recording medium according to the present invention can be used to manufacture a recording medium that has an arrangement of recording marks 1 that can be fine indentations and/or fine projections 2, as shown, for example, by the simplified overhead view given in FIG. 1.

When manufacturing a recording medium according to the method of the present invention, a material layer formed on a substrate that composes the recording medium is exposed to a laser beam in accordance with a recording pattern. The material layer may be a heat-sensitive material layer, for example, and has a predetermined reflectivity for the laser beam.

As a result, return light is produced for the laser beam that exposes the material layer. By detecting this return light, focus adjusting is performed for the spot produced by the exposing laser beam on the material layer.

In the method for manufacturing a recording medium according to the present invention, a silicon dioxide ($SiO_2$) substrate for composing the recording medium is first prepared. This is achieved by forming a layer of silicon dioxide on a transparent resin substrate or a glass substrate, for example. This silicon dioxide substrate is then given a coating of a heat-sensitive material as the material layer with the special characteristic mentioned above.

When the heat-sensitive material layer is exposed to a laser beam in accordance with a pattern that corresponds to the desired arrangement of fine indentations and/or projections 2, which is to say, a pattern showing the arrangement of the recording marks 1 shown in FIG. 1, for example, or an inverse pattern of this arrangement, the temperature of the heat-sensitive material layer rises at the parts that have been exposed to the laser, resulting in altered parts being created in the heat-sensitive material layer.

Figure 2:
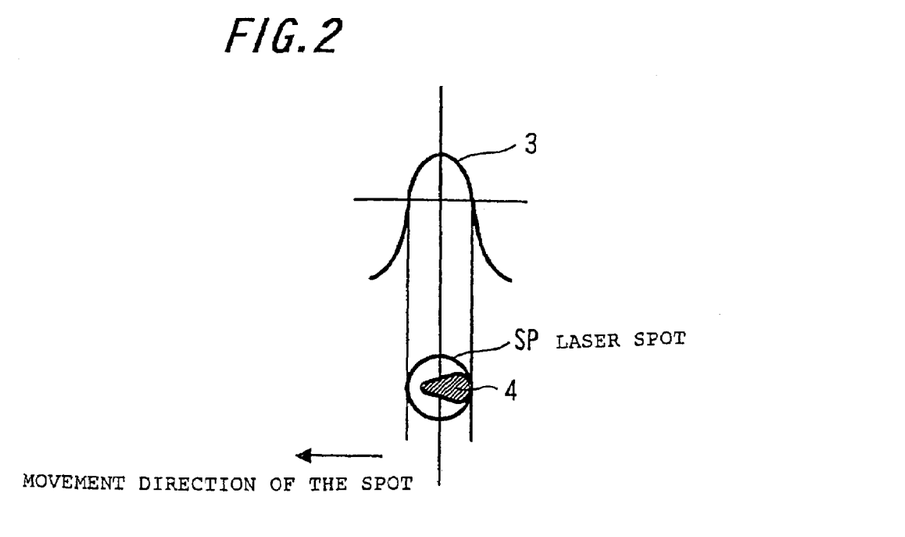
FIG. 2 shows the relationship between the power distribution of the laser beam used in the methods of the present invention and the raised-temperature regions.

If it is assumed that the power distribution of the spot produced by the exposing laser beam is as shown by the curve 3 in FIG. 2, for example, and that SP shows the effective laser spot on the heat-sensitive material layer, the altered part of the heat-sensitive material layer, which is to say, the raised-temperature region 4, is smaller than the laser spot SP. This means that the altered part can be made smaller than the laser spot, and that by setting the laser power appropriately, for example, the width of the raised-temperature region 4, which is to say, the altered part, can be made smaller.

The reason that the raised-temperature region 4 has a shape that widens out in an opposite direction to a direction in which the spot moves is that the time for which the exposing laser beam is effectively incident increases in this direction.

Figure 3A:
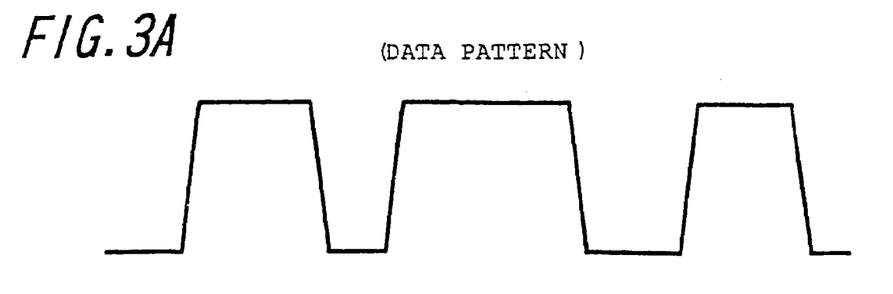
FIGS. 3A to 3D are representations of the modulation of a laser beam used in the method for manufacturing a recording medium and a production plate used when manufacturing recording media according to the present invention, with FIG. 3A showing a data pattern, FIG. 3B and FIG. 3C showing a pattern in which a laser beam is shone, and FIG. 3D showing a pattern of fine indentations and/or projections.
Figure 3B:
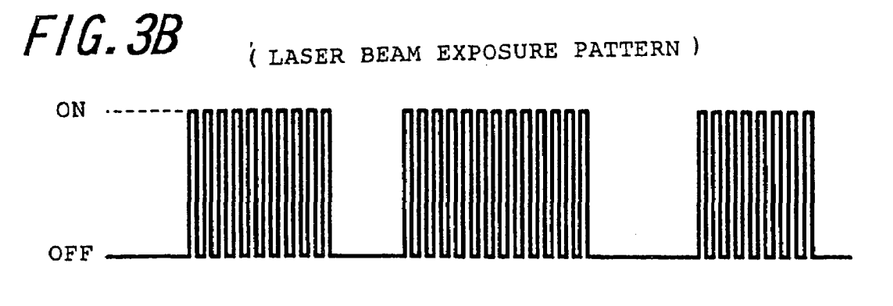
Figure 3C:
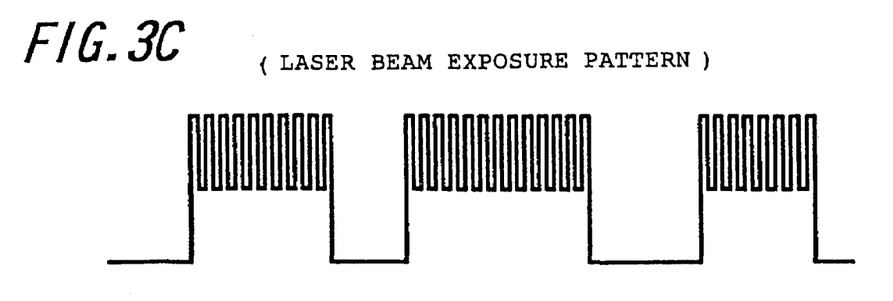

The intensity of the laser beam used to expose the heat-sensitive material layer is modulated in accordance with the desired pattern of fine indentations and/or projections to be formed. As one example, when the recorded data pattern to be formed on a recording medium is as shown in FIG. 3A, the laser is modulated using a recorded data signal based on this data pattern and is simultaneously modulated, as shown in FIGS. 3B and 3C, using a signal with a constant high frequency (such as several hundred MHz) that is higher than the frequency of the recorded data signal. This means that a laser beam with a power level that is sufficiently high to produce a rise in the temperature which results in the creation of altered parts in the heat-sensitive material layer is selectively shone onto parts of the photosensitive material layer where the altered parts are to be formed. The laser beam is modulated so that at these parts, the laser beam is repeatedly switched on and off using high frequency as shown in FIG. 3B, resulting in the heat-sensitive material layer being exposed to a pulsed laser beam. Alternatively, the power of the laser beam is repeatedly modulated above a given level, as shown in FIG. 3C, so that the laser beam is selectively shone onto the parts of the heat-sensitive material layer to be altered.

After this, the heat-sensitive material layer is developed, resulting in the removal of the altered parts or alternatively of the parts that have not been altered. This forms a pattern in the heat-sensitive material layer.

As described above, forming a pattern in the heat-sensitive material layer results in fine indentations and/or projections being formed in the heat-sensitive material layer, so that a recording medium with fine indentations and/or projections can be produced. In this case, the depth of the fine indentations and/or projections (i.e., the difference between the high and low parts) is subject to restrictions, such as the thickness of the heat-sensitive material layer. As a result, reactive ion etching (RIE) can be performed, such as by performing anisotropic etching, to a predetermined depth of the surface of the substrate with the heat-sensitive material layer as an etching mask. This produces fine indentations and/or projections with the required depth.

In the above method, a heat-sensitive material layer is used and altered parts are formed in the heat-sensitive material layer by exposing the heat-sensitive material layer to a laser beam. When doing so, the width of the altered parts formed in the heat-sensitive material layer, which is to say, the width W of the recording marks in FIG. 1 can be made fine, as can the track pitch P. Fine indentations and/or projections can be formed with a high density.

When the laser is subject to high frequency modulation as shown in FIG. 3B or FIG. 3C, this results in the heat-sensitive material layer being intermittently exposed or being exposed to a laser beam whose intensity repeatedly switches between high and low. The recording mark pattern obtained in these cases is as shown by the regions a that have been shaded in FIG. 3D. These marks are accurately formed with a consistent width that does not depend on the length of the recording marks.

Figure 3D:
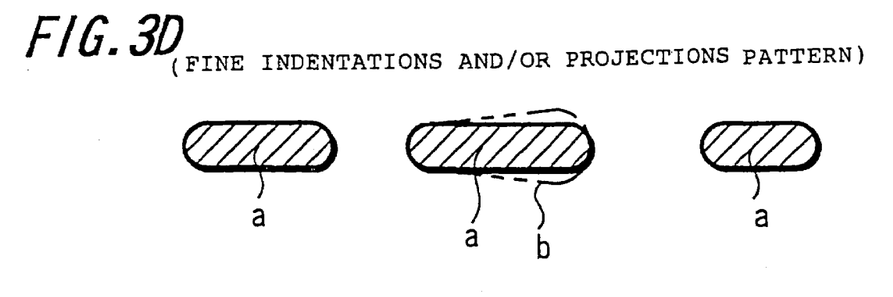

When the laser beam that is incident on the heat-sensitive material layer is not subjected to this kind of high frequency modulation and so is only modulated in accordance with a data pattern, long altered parts of the heat-sensitive material layer are subjected to long continuous periods of exposure to a laser beam, resulting in the raised-temperature region expanding outward in a direction that is opposite to the scanning direction of the laser beam, and the width of the altered parts expanding in a direction that is opposite to the scanning direction of the laser beam as shown by the dotted line b in FIG. 3D. In this case, the width of a recording mark depends on the length of the recording mark.

When, as described above, the laser is subjected to high frequency modulation and so is applied intermittently or the intensity is repeatedly switched between high and low, rises in temperature can be suppressed, even in long recording marks. As a result, improved altered parts can be formed. This means that an improved mark pattern can be formed without dependence on the length of the recording marks.

As described above, laser exposure is used to form altered parts, which is to say, fine indentations and/or projections. While the material layer for the present invention is a heat-sensitive material layer, this layer is produced so as to have a predetermined reflectivity, so that return light is produced for the laser beam incident on the heat-sensitive material layer. In the present invention, this return light is used by a focusing servo.

The focusing servo referred to here is described later, though in short, a focusing servo construction is normally provided in an optical pickup that is used for the optical recording or reproduction of a standard optical disk, magneto-optical disk, optical phase-change disk, or the like. Such focusing servo construction usually uses a method such as the "astigmatic method", "knife-edge method", "wedge-prism method", or "critical angle method".

The method of the present invention for manufacturing a production plate used when manufacturing recording media is able to produce a production plate that is used when manufacturing, using injection molding, the photo polymerization method, or the like, a recording medium including an arrangement 2 of fine indentations and/or projections composing the recording marks 1, such as the recording medium whose surface is shown from above in FIG. 1, for example.

This method for manufacturing a production plate starts with the provision of a substrate that composes the production plate. A material layer described above, such as a heat-sensitive material layer, is then formed on the surface of this substrate.

After this, a laser beam is shone onto the heat-sensitive material layer in accordance with a pattern that corresponds to the desired arrangement of fine indentations and/or projections (which can be, for example, a pattern showing the arrangement of the indentations 1 which composes the recording marks shown in FIG. 1, or an inverse pattern of this arrangement). This results in altered parts being created in the exposure pattern in the heat-sensitive material layer.

In this case also, a modulated laser is shone onto the heat-sensitive material layer, as described for the case shown in FIGS. 3A to 3D.

After this, the heat-sensitive material layer is developed, resulting in the removal of the altered parts or alternatively of the parts that have not been altered and creation of the pattern in the heat-sensitive material layer. For the reason that was described with reference to FIG. 2, altered parts that are narrower than the spot produced by the laser beam can be formed.

In this case also, the transfer of a pattern onto the heat-sensitive material layer results in fine indentations and/or projections being formed in the heat-sensitive material layer. The resulting disk can be used as a production plate used when manufacturing recording media with fine indentations and/or projections. In this case, the depth of the fine indentations and/or projections (i.e., the difference between the high and low parts) is subject to restrictions such as the thickness of the heat-sensitive material layer. As a result, RIE can be performed, such as by performing anisotropic etching, to a predetermined depth of the surface of the substrate with the heat-sensitive material layer as an etching mask, thereby producing the production plate by forming fine indentations and/or projections with the required depth.

As described earlier, this production plate can be used as a stamper, a so-called "master disk" that is used to form a plurality of stampers, or a so-called "mother master disk" that is used to form a plurality of masters.

Like the method for manufacturing a recording medium, the method for manufacturing a production plate according to the present invention uses a heat-sensitive material layer and has this heat-sensitive material layer exposed to a laser beam to produce altered parts. As a result, very fine indentations and/or projections can be produced, resulting in a higher density.

Also, the laser is subjected to high frequency modulation and so is applied intermittently or has its intensity repeatedly switched between high and low. This means that improved fine indentations and/or projections can be formed without dependence on the length of the recording marks.

Also, when manufacturing a production plate used when manufacturing recording media, the heat-sensitive material layer forming-the material layer on the production plate is produced so as to have a predetermined reflectivity, so that return light is produced for the laser light incident on the heat-sensitive material layer. In the present invention, this return light is used by a focusing servo.

The focusing servo referred to here also usually uses a method such as the "astigmatic method", "knife-edge method", "wedge-prism method", or "critical angle method".

The heat-sensitive material layer used in the method for manufacturing a recording medium and the method for manufacturing a production plate used when manufacturing recording media of the present invention can have a laminated composition of at least two layers each composed of different materials, which is to say, the heat-sensitive material layer can be composed of at least a first material layer and a second material layer. The rise in temperature due to exposure to a laser beam can result in the materials in the two layers dispersing or melting into one another. In this case, the altered parts can be produced due to the mixing of the two or more materials, or a reaction occurring between them.

The materials forming the heat-sensitive material layer should preferably be inorganic substances.

The following are specific examples of possible compositions for the heat-sensitive material layer. As two-layer constructions, a laminated construction of an aluminum layer and a copper layer, a laminated construction of an aluminum layer and a germanium layer, a laminated construction of a silicon layer and an aluminum layer, or a laminated construction of a germanium layer and a gold layer may be used. The heat-sensitive material layer is not limited to a two-layer construction, and a construction with three or more laminated layers may be used. As another alternative, a metal, such as titanium or tantalum, that undergoes thermal oxidation may be used to form a heat-sensitive material layer with a single-layer construction. In this case, exposure to a laser beam results in the heat-sensitive material layer reacting with oxygen in the atmosphere to produce altered parts.

The laser beam to which the heat-sensitive material layer is exposed should preferably be a semiconductor laser, and in particular a short-wavelength blue-violet laser (with a wavelength of 390 to 410 nm, for example), such as a GaN laser.

Using a laser with a short wavelength helps reduce the size of the spot produced by the laser beam.

The process used to develop the pattern formed in the heat-sensitive material layer is performed using a 1 to 3% aqueous solution of tetra methyl ammonium hydroxide.

Figure 4A:
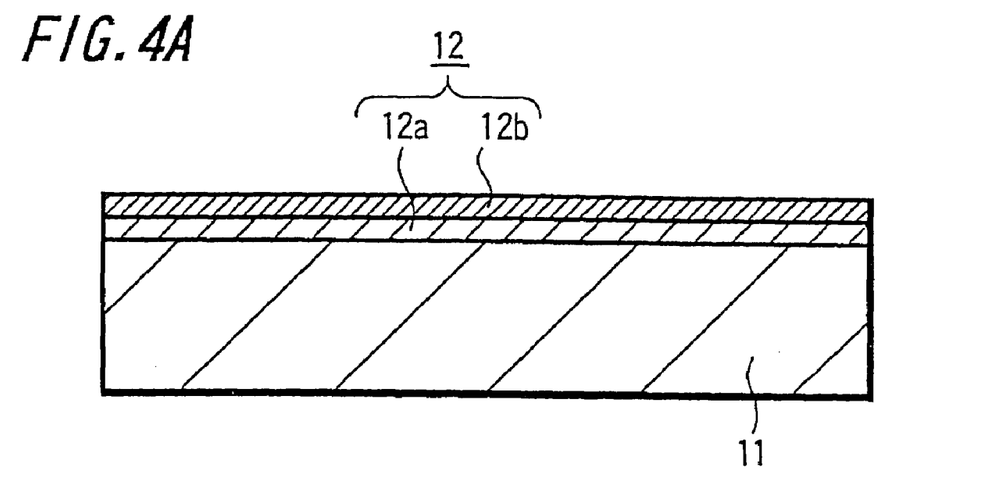
FIGS. 4A and 4B are representations of example processes that are performed in a method for manufacturing a recording medium and a production plate used when manufacturing recording media according to the present invention.
Figure 4B:
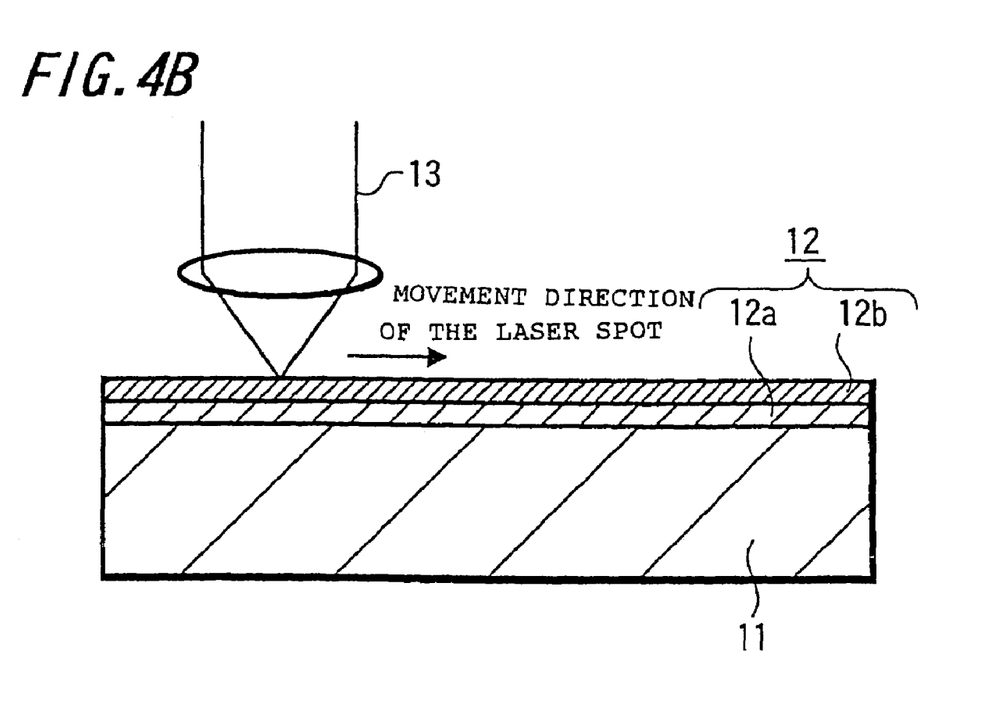

The following describes an embodiment of the method for manufacturing a recording medium according to the present invention, with reference to the processes shown in FIGS. 4 and 5. It should be noted that the method for manufacturing a production plate used when manufacturing recording media according to the present invention is not limited to this embodiment.

As shown in FIG. 4A, a circular silicon dioxide substrate 11 for composing the recording medium is first prepared. This is achieved by forming a layer of silicon dioxide (not illustrated) on a glass substrate, for example. A heat-sensitive material layer 12 is then formed on the surface of the silicon dioxide. This heat-sensitive material layer 12 is a thin film that is altered, i.e., its characteristics change, due to a rise in temperature that occurs due to exposure to a laser beam.

In the present example, the heat-sensitive material layer 12 is formed of a laminated construction composed of a first material layer 12a and a second material layer 12b.

The first material layer 12a and second material layer 12b are assumed to be composed so that the rise in temperature due to exposure to a laser beam results in the two materials diffusing or melting into one another to produce an altered part. This can be due to the materials becoming alloyed, for example. At the same time, the materials are selected so that there is a difference in the rates at which the altered parts and non-altered parts dissolve in a developer liquid (solution) used in the developing process described later.

Example combinations of the materials used to form the first material layer 12a and second material layer 12b include aluminum and copper, and aluminum and germanium.

As shown in FIG. 4B, a laser beam 13 is moved relative to the heat-sensitive material layer 12 so that a laser spot formed on the heat-sensitive material layer 12 moves in a predetermined direction shown by the arrow in FIG. 4B to trace a circle or spiral on the substrate 11. This relative movement can be achieved, for example, by rotating the circular substrate 11 and moving the laser spot in a radial direction for the circular substrate 11. During this relative movement, the laser beam is adjusted in accordance with a pattern corresponding to a desired data pattern as shown in FIG. 3, for example, and is simultaneously subjected to high-frequency modulation as shown in FIG. 3B or 3C, for example, with a higher frequency than the data pattern. The changes in the power of the laser beam result in the temperature of the heat-sensitive material layer 12 rising at parts that correspond to a predetermined pattern. At these parts where the temperature rises, the materials forming the first material layer 12a and the second material layer 12b of the heat-sensitive material layer 12 are alloyed, for example, resulting in the formation of altered parts 12s that correspond to a desired arrangement of fine indentations and/or projections.

During this process, part of the incident laser beam is reflected back off the heat-sensitive material layer 12 and is used to perform focusing control. This is to say, focusing control is performed while positions in a predetermined pattern on the heat-sensitive material layer are heated using a laser beam.

Figure 5A:
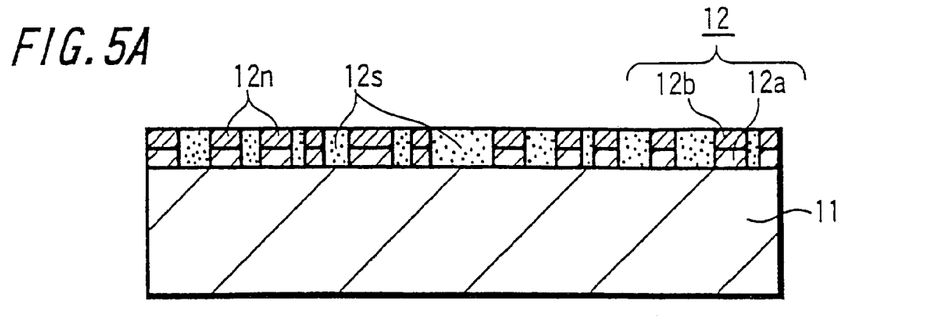
FIGS. 5A to 5D are representations of other example processes that are performed in a method for manufacturing a recording medium and a production plate used when manufacturing recording media according to the present invention.

As a result of doing so, as shown in FIG. 5A, altered parts 12s where the materials have become alloyed and non-altered parts 12n, that is, the remaining parts where the materials are not alloyed, are formed in the heat-sensitive material layer 12.

Figure 5B:
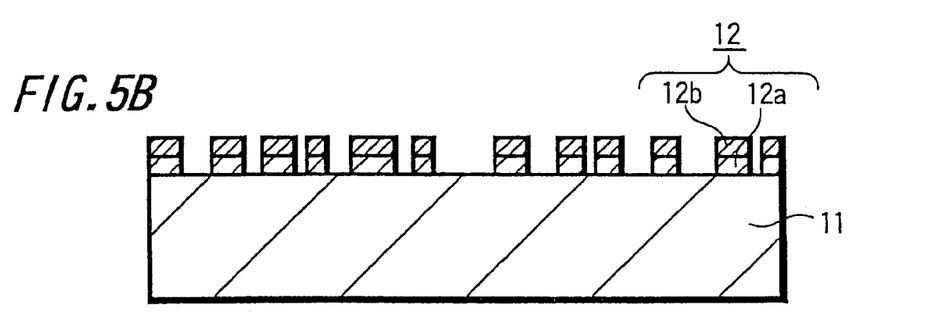

After this, a developing process, which is to say, a selective etching, is performed on the heat-sensitive material layer 12 so that the altered parts 12s are removed, as shown in FIG. 5B.

As one example, an aqueous solution of tetra methyl ammonium hydroxide with a concentration of about 1 to 3% can be used as the developer, which is to say, the etching liquid used on the altered parts. By applying this developer, the altered parts 12s, which are alloyed, can be selectively etched, resulting in their removal and in the formation of a pattern in the heat-sensitive material layer 12.

Figure 5C:
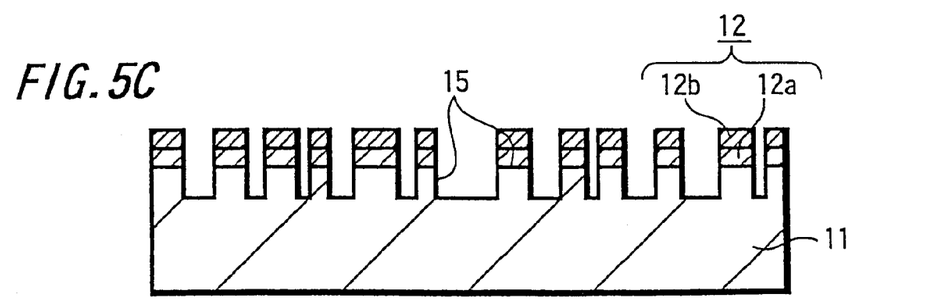

After this, in the present example, the heat-sensitive material layer 12, in which a fine pattern has been formed, is used as an etching mask, as shown in FIG. 5C, so that fine indentations and/or projections 15 are formed on the substrate 1, such as in the silicon dioxide layer on the surface of the substrate 1.

By performing reactive ion etching (RIE) achieved using anisotropic etching, this etching can form fine indentations and/or projections 15 whose cross-sections exhibit a high degree of perpendicularity.

The difference between the high and low parts of the fine indentations and/or projections 15 (or, in other words, their depth) can be freely set, such as by appropriately setting the thickness of the silicon dioxide layer on the surface of the substrate. Also, in some cases, a base substrate below the silicon dioxide surface layer can be used as an etching stopper, so that the depth of the fine indentations and/or projections 15 can be controlled by the thickness of the silicon dioxide surface layer.

After this, the first material layer 12a and second material layer 12b of the heat-sensitive material layer 12 are successively dissolved in solvents to remove these layers.

Figure 5D:
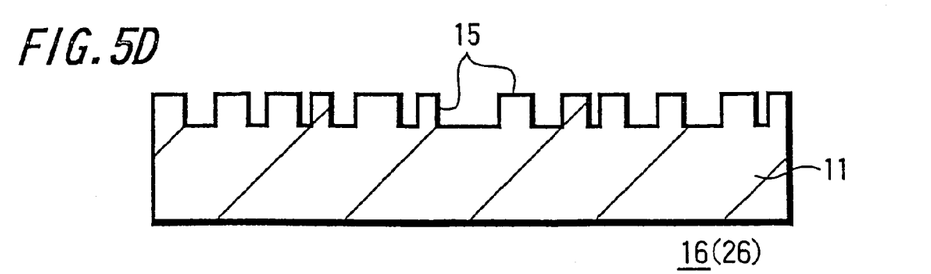

The above processes produce a substrate 11 that has fine indentations and/or projections 15 formed in its surface, as shown in FIG. 5D.

After this, though not illustrated, other layers, such as a reflective film, a protective film, and in some cases, a variety of recording layers such as a magnetic layer and a phase change material layer, are formed on the substrate 11, from which the heat-sensitive material layer 12 has been removed and in whose surface the fine indentations and/or projections 15 have been formed. This produces the desired recording medium 16, which can be an optical disk, a magneto-optical disk, an optical phase-change disk, or the like.

In the method described above, the heat-sensitive material layer 12 is described as being subjected to a developing process after exposure to a laser beam. In this developing process, selective etching is performed using aqueous solution of tetra methyl ammonium hydroxide. In this case, the same processes are performed as in a conventional method for manufacturing a production plate where novolac resin is used to produce its photosensitive material layer. This means that the present invention has an advantage of allowing the use of the same equipment and processes as a conventional method.

It should be noted that in the above example, the case where exposure to a laser forms altered parts in the heat-sensitive material layer 12 and these altered parts are removed by a developing process (that is, selective etching) is described, though the developing process may alternatively remove the non-altered parts.

In this alternate case, the heat-sensitive material layer 12 can be formed of a combination of germanium and aluminum, or alternatively another combination such as silicon and aluminum, or germanium and gold. In this case, the first material layer and second material layer can be removed for the non-altered parts using a mixture of phosphoric acid, water, and glycerin and a mixture of a tartaric acid solvent and hydrogen peroxide acid.

The heat-sensitive material layer 12 is not restricted to having a multilayer construction, and so can be composed of a single layer of a metal, such as titanium or tantalum, that undergoes thermal oxidation so as to form the altered parts 12s. In this case, exposure to the laser beam has the metal react with oxygen present in the atmosphere.

As described above, according to the present invention, a single-layer or multilayer heat-sensitive material layer can be formed of inorganic substances, so that the single-layer or multilayer heat-sensitive material layer can be formed by sputtering, vacuum deposition, or other method. Compared with conventional methods where the photosensitive material layer is usually formed by spin coating, a thinner and more even layer can be formed.

One example of an advantage achieved by this is that the fine indentations and/or projections that form the recording marks etc. can be accurately formed.

Also, as described above, fine indentations and/or projections 15 are formed by etching the substrate 11 using RIE, for example, with the heat-sensitive material layer 12 in which a pattern has been formed as a mask. This has the advantage of preventing the thickness of the heat-sensitive material layer 12 or its cross-sectional form from affecting the depth and/or form of the fine indentations and/or projections, such as would happen in a case where the fine indentations and/or projections are formed using the heat-sensitive material layer 12 itself.

The following describes an embodiment of a method for manufacturing a production plate according to the present invention. This method for manufacturing a production plate can be standardized with the method that is described above with reference to FIGS. 4A to 4B and 5A to 5D, with in this case the substrate 11 forming the production plate. In this case also, the kind of silicon dioxide substrate described above can be used.

A production plate 26, as shown in FIG. 5D, that has been manufactured in this way can be used as a stamper, as a master for producing stampers by inversely transferring a pattern, or even as a mother master for producing masters by inversely transferring a pattern.

A recording medium substrate that has a desired pattern of fine indentations and/or projections can be produced via injection molding, the 2P method, or the like, with a stamper thus obtained. Like the recording medium described above, other layers, such as a reflective film, a protective film, and in some cases, a variety of recording layers can be formed. This produces the desired recording medium, which can be an optical disk, a magneto-optical disk, an optical phase-change disk, or the like.

Figure 6:
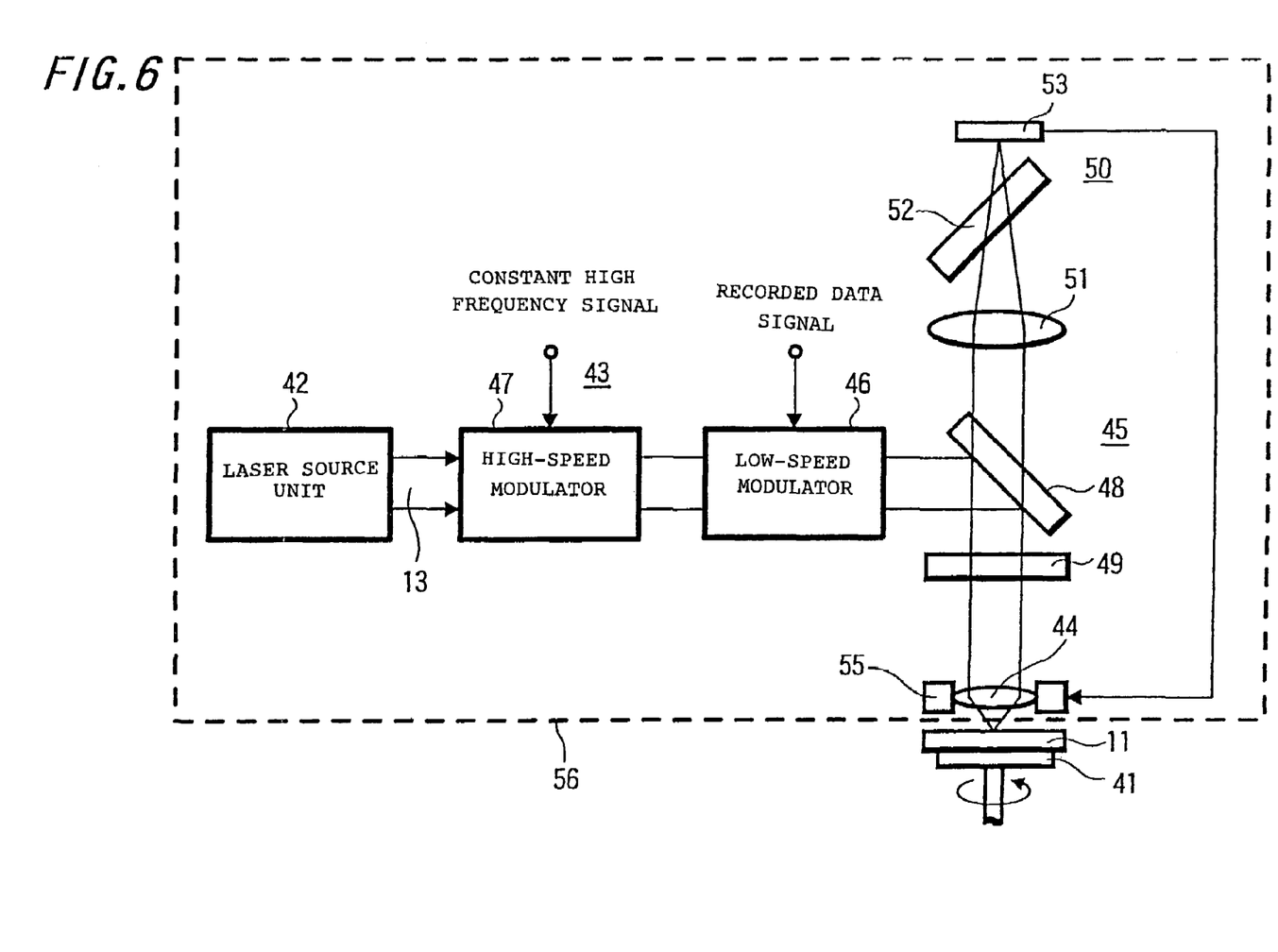
FIG. 6 shows one example of the construction of an apparatus for manufacturing a recording medium and a production plate used when manufacturing recording media according to the present invention.

Also, according to the present invention, an apparatus for manufacturing recording media is as shown by the simplified block diagram in FIG. 6. This apparatus has a holding means 41, a laser source unit 42, an optical system 45, a moving means 56, and a focus adjusting means 50. The holding means 41 holds a circular substrate 11 for composing a recording medium, the substrate 11 being covered with a material layer (not illustrated), such as a heat-sensitive material layer, that has a predetermined reflectivity. The optical system 45 includes a modulating means for modulating a laser beam 13 produced by the laser source unit 42 in accordance with a pattern of fine indentations and/or projections and using a frequency that is higher than a cycle of the pattern of fine indentations and/or projections, and a condensing lens system 44 for having the laser beam focused on the material layer on the substrate 11. The moving means has the position where the laser beam is incident on the substrate 11. The focus adjusting means 50 detects return light that is reflected by altered parts of the material layer, and uses the return light to adjust the focusing.

In the construction shown in FIG. 6, the optical system 45 includes a polarized beam splitter 48, a quarter-wave plate 49, a condensing lens system (objective lens) 44, and an optical system that forms a focus adjusting means 50 which uses astigmatism. As one example, the optical system forming the focus adjusting means 50 may include a condensing lens 51, and a means 52, such as a cylindrical lens or a parallel glass plate, that produces astigmatism or astigmatic difference when the light is defocused.

Figure 8:
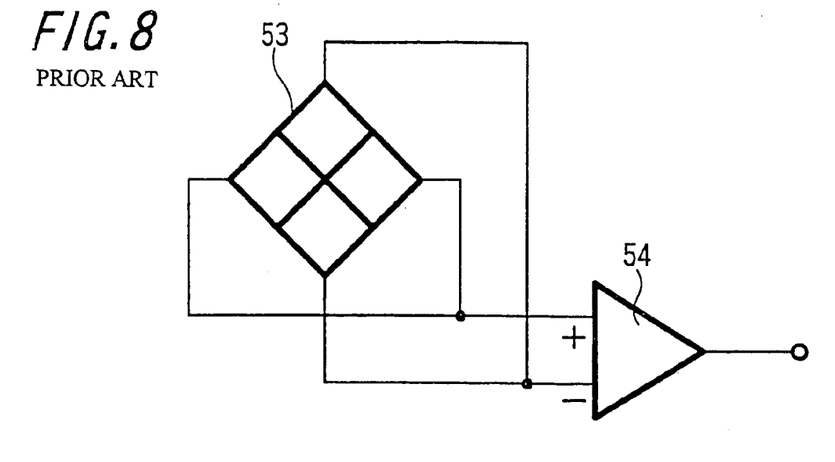
FIG. 8 shows one example of a circuit for extracting a focusing servo signal.

A focusing servo signal detecting circuit of the focus adjusting means 50 can be composed of a photodetector 53 that is composed of photo diode divided into four as shown in FIG. 8, and a differential amplifier 54. The photodetector 53 is constructed so that a difference in the detected outputs of opposed pairs of photodiode elements is amplified by the differential amplifier 54 to produce the focusing servo signal.

When the laser beam is in perfect focus, the spot created by the return light is incident in shape of a circle located at the center of the photodetector 53, so that the detected signal is zero. When the system is out of focus, the astigmatism or astigmatic difference means 52 makes the spot on the photodetector 53 asymmetrical with regard to the center. This means that a detection signal, which is to say, a focusing servo signal, is obtained.

On the other hand, the condensing lens (objective lens) 44 is held by an actuator 55, so that the position can be controlled by the focusing servo signal, thereby making focusing adjustments possible.

The moving means is composed of a sliding stage 56 on which the optical system 45 including at least the condensing lens system 44 is arranged. This moving means is constructed so that the position at which the laser beam 13 is incident can be moved in a radial direction for the substrate 11, for example.

The substrate 11 is rotationally driven by the holding means 41, for example, that supports the substrate 11. When combined with the movement by the moving means, i.e., the sliding stage 56, described above, the laser beam 13 scans the material layer, i.e., the heat-sensitive material layer, on the substrate 11 in concentric circles or alternatively in a spiral.

The laser beam 13 is modulated, as shown in FIG. 3, by a high-speed modulator 47 and low-speed modulator 46 using both a predetermined high-frequency signal and a recorded data signal.

The laser source unit 42 need not use a semiconductor laser, and can be constructed so as to include a laser, such as an argon gas laser, and a wavelength converter that converts the laser to a short-wavelength laser. In this case, as shown in FIG. 6, the high-speed modulator 47 and the low-speed modulator 46 are provided on an optical path whereby the laser beam 13 from the laser source unit 42 is guided to the substrate 11 by the optical system 45.

The low-speed modulator 46 modulates the laser beam 13 using the recorded data signal as shown for example in FIG. 3, while the high-speed modulator 47 modulates the laser beam 13 using a predetermined high-frequency signal, as shown for example in FIG. 3.

A variety of conventional modulators may be used as the low-speed modulator 46, such a modulator that uses the electro-optic (EO) effect, a modulator that uses the acousto-optic (AO) effect, or a modulator that uses a different kind of effect.

As one example, the modulator described in the article "A rewritable optical disk system with over 10 GB of capacity" by K. Osato, K. Yamamoto, I. Ichimura, F. Maeda, Y. Kasami, and M. Yamada, pages 80–86 in "Proceedings of Optical Data Storage '98", Aspen, Colorado may be used as the high-speed modulator 47.

In this way, the material layer on the substrate 11 is exposed to the laser beam 13, resulting in the formation of altered parts in the heat-sensitive material layer.

Figure 7:
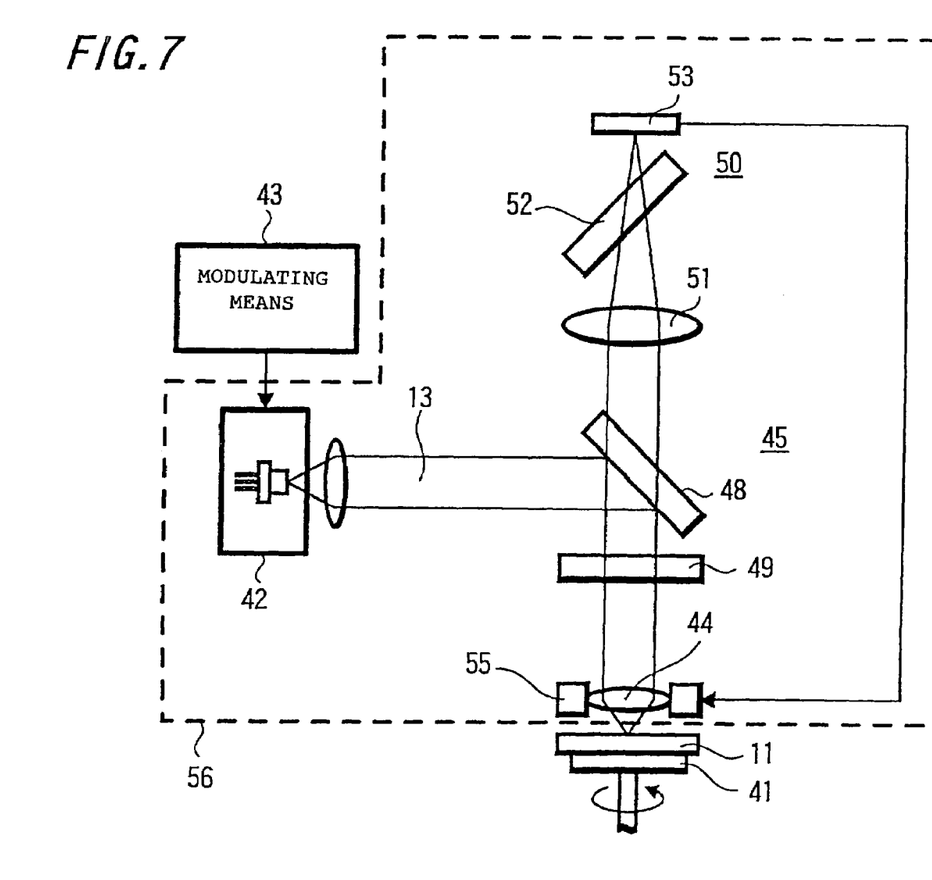
FIG. 7 shows another example of the construction of an apparatus for manufacturing a recording medium and a production plate used when manufacturing recording media according to the present invention.

In the simplified construction shown in FIG. 7, the laser source unit 42 is composed of a semiconductor laser. Components that are the same as the components in FIG. 6 have been given the same reference numerals in FIG. 7 and are not explained further. In the construction in FIG. 7, a modulating means 43 modulates the current applied to the semiconductor laser using the recorded data signal and predetermined high-frequency signal described above.

With the apparatus according to the present invention described above, exposure of the heat-sensitive material layer to a laser beam is followed, as in the method according to the present invention, by a developing of the heat-sensitive material layer. In this developing, etching or a similar process is performed to produce a recording medium with the desired fine indentations and/or projections.

An apparatus for manufacturing a production plate used when manufacturing recording media according to the present invention can have the same construction as the apparatuses shown in FIG. 6 and FIG. 7, except that the substrate holding means 41 holds a substrate for forming a production plate.

In the above example, the focus adjusting means is described as having a construction where astigmatism-based focusing is performed, although, as mentioned earlier, the focusing may be performed using the "knife-edge method", "wedge-prism method", or "critical angle method".

With the manufacturing apparatus for a recording medium and manufacturing apparatus for manufacturing a production plate used when manufacturing recording media according to the present invention, a simple, compact construction can be used, so that these apparatuses can be realized in small sizes and at low cost.

In particular, when the construction shown in FIG. 7 is used, the use of a semiconductor laser enables the apparatuses to be made even smaller, cheaper, and more compact. Maintenance is also far easier for such apparatuses.

In this case, a short-wavelength laser, such as a GaN laser, may be used as the semiconductor laser. By doing so, even finer indentations and/or projections can be formed, leading to further increases in recording density.

As described above, the present invention can be used to manufacture recording media having fine indentations and/or projections, such as read-only optical disks, rewritable optical disks, phase-change optical disks, magneto-optical disks, and magnetic disks. The present invention is not limited to producing such recording media in a circular form, and can be adapted as another embodiment to manufacturing recording media that are card-shaped, for example.

The fine indentations and/or projections that are finally formed on a recording medium according to the present invention do not need to be in the shape of pits, and can be in the form of grooves, or the like. A variety of different constructions may be used.

As described above, with a method for manufacturing a recording medium or a production plate used when manufacturing recording media according to the present invention, the material layer 12 with a predetermined reflectivity for the laser beam used is provided, and the return light produced for the laser beam is detected to produce a focusing servo signal. This means that unlike conventional methods, a separate red laser or the like does not need to be provided. The equipment used therefore does not require a complicated construction, does not need to be adjusted, and is also easier to handle.

The present invention uses a heat-sensitive material layer unlike ordinary cases where a photosensitive material is used. Exposure to a laser beam produces parts that are thermally altered. In the developing process, either the altered parts or the non-altered parts are removed, thereby producing a pattern. Since the heated regions forming altered parts can be made narrower than the spot produced by the laser beam, fine indentations and/or projections that are finer than the optical limit of the laser beam spot can be formed as a fine pattern.

As a result, a recording medium with high recording density and high resolution can be produced.

The laser beam that is shone onto the heat-sensitive material layer is modulated using a recorded data signal, for example, and is simultaneously modulated using a predetermined high-frequency signal that has a higher frequency than the recorded data signal. As a result, when long patterns are formed, it is possible to effectively avoid situations where the rise in temperature due to exposure to the laser beam causes the shape of the altered parts in the heat-sensitive material layer to widen out in a direction that is opposite to the direction in which the laser moves.

With the present invention, the shapes of the altered parts in the heat-sensitive material layer are not affected by the lengths of the altered parts, so that the desired shapes can be accurately formed. This means that a recording medium with the desired high recording density and high resolution can be formed.

With the manufacturing apparatus for a recording medium and the manufacturing apparatus for a production plate used when manufacturing recording media according to the present invention, there is no need to provide a high vacuum chamber or the like, making the apparatuses compact, small, and cheap. Maintenance is also simple for these apparatuses. The apparatuses are also capable for accurately producing recording media with high recording densities.

With the method for manufacturing recording media and the method for manufacturing a production plate used when manufacturing recording media, the manufacturing apparatus for recording media, and the manufacturing apparatus for a production plate used when manufacturing recording media according to the present invention, recording media with high recording densities can be produced accurately. This makes the present invention especially effective for manufacturing recording media that are optically recorded and reproduced using a near-field construction and recording media that are recorded and reproduced using a short-wavelength blue-violet laser.

The invention claimed is:

1. A method for manufacturing a production plate used when manufacturing recording media, the method comprising the steps of:
    exposing a material layer formed on a substrate composing the production plate to a laser beam in accordance with a recording pattern to form an altered part and a non-altered part;
    developing the material layer so as to produce a pattern in the material layer by removing either the altered part or the non-altered part of the material layer; and
    focusing the laser beam on the material layer by detecting a return light of the laser beam which forms the altered part,
    wherein the material layer is composed of a heat-sensitive material layer which is altered by heat and made of an inorganic substance.

2. A method for manufacturing a production plate used when manufacturing recording media according to claim 1, wherein the laser beam is a blue-violet laser beam.

3. A method for manufacturing a production plate used when manufacturing recording media according to any of claims 1 and 2, wherein
    the laser beam is focused on the material layer by a condensing lens, and a spot produced by the laser beam is adjusted by moving a position of the condensing lens.

4. A method for manufacturing a production plate used when manufacturing recording media according to claim 1, wherein
    a pattern is formed in the substrate composing the production plate with the material layer in which the pattern has been formed as a mask, the pattern being from the group consisting of fine indentations and projections.

5. A method for manufacturing a production plate used when manufacturing recording media according to claim 1, wherein
    when the material layer formed of the heat-sensitive material layer is exposed to the laser beam in accordance with the recording pattern, the laser beam is modulated using a frequency that is higher than a cycle of the recording pattern.

6. A method for manufacturing a production plate used when manufacturing recording media according to claim 4, wherein
    the pattern of fine indentations and/or projections is formed in the substrate composing the production plate by performing reactive ion etching with the material layer in which the pattern has been formed as a mask.

* * * * *